(12) United States Patent
Flin et al.

(10) Patent No.: US 10,888,834 B2
(45) Date of Patent: Jan. 12, 2021

(54) EXCHANGER-REACTOR PERFORMING STEAM REFORMING AND WATER GAS REACTIONS FOR THE PRODUCTION OF HYDROGEN

(71) Applicant: L'Air Liquide, Société Anonyme pour l'Etude et l'Exploitation des Procédés Georges Claude, Paris (FR)

(72) Inventors: Matthieu Flin, Vanves (FR); Marie Basin, Versailles (FR); Olivier Dubet, Buc (FR); Daniel Gary, Montigny le Bretonneux (FR); Laurent Prost, Gif sur Yvette (FR); Solène Valentin, Meudon (FR); Marc Wagner, Saint Maur des Fosses (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 59 days.

(21) Appl. No.: 15/754,710

(22) PCT Filed: Aug. 19, 2016

(86) PCT No.: PCT/FR2016/052092
§ 371 (c)(1),
(2) Date: Feb. 23, 2018

(87) PCT Pub. No.: WO2017/032944
PCT Pub. Date: Mar. 2, 2017

(65) Prior Publication Data
US 2018/0193818 A1 Jul. 12, 2018

(30) Foreign Application Priority Data

Aug. 24, 2015 (FR) .................................. 15 57876

(51) Int. Cl.
*B01J 19/24* (2006.01)
*B01J 19/00* (2006.01)

(52) U.S. Cl.
CPC ......... *B01J 19/249* (2013.01); *B01J 19/0093* (2013.01); *B01J 2219/0086* (2013.01);
(Continued)

(58) Field of Classification Search
CPC combination set(s) only.
See application file for complete search history.

(56) References Cited

U.S. PATENT DOCUMENTS 7,250,151 B2    7/2007 Tonkovich et al.
8,617,265 B2 *  12/2013 Chellappa .............. B01J 19/248
                                                    48/61

(Continued)

OTHER PUBLICATIONS

International Search Report for corresponding PCT/FR2016/052092, dated Nov. 16, 2016.

(Continued)

*Primary Examiner* — Kaity V Chandler
(74) *Attorney, Agent, or Firm* — Elwood L. Haynes

(57) ABSTRACT

The invention relates to an exchanger-reactor comprising at least three stages with at least one stage comprising both: millimetric channels at least partially covered with a catalyst for stimulating a steam reforming reaction, and millimetric channels at least partially covered with a catalyst for stimulating a water gas reaction.

6 Claims, 2 Drawing Sheets

(52) U.S. Cl.
CPC ......... *B01J 2219/00783* (2013.01); *B01J 2219/00822* (2013.01); *B01J 2219/00835* (2013.01); *B01J 2219/00846* (2013.01); *B01J 2219/2479* (2013.01); *C01B 2203/0233* (2013.01)

(56) References Cited

U.S. PATENT DOCUMENTS

| | | | | |
|---|---|---|---|---|
| 2002/0168307 | A1* | 11/2002 | Seaba | C01B 3/323 422/198 |
| 2004/0043263 | A1* | 3/2004 | Takeyama | C01B 3/48 48/127.9 |
| 2004/0060238 | A1* | 4/2004 | Retallick | B01J 12/007 48/198.3 |
| 2004/0223908 | A1* | 11/2004 | Holladay | C01B 3/323 423/648.1 |
| 2005/0138864 | A1 | 6/2005 | Johnston et al. | |
| 2006/0008398 | A1* | 1/2006 | Park | H01M 8/0618 422/600 |
| 2006/0051262 | A1* | 3/2006 | Park | B01B 1/005 422/198 |
| 2006/0093532 | A1* | 5/2006 | Park | B01J 19/249 422/129 |
| 2006/0117660 | A1* | 6/2006 | Woo | C01B 3/583 48/61 |
| 2006/0185243 | A1* | 8/2006 | Kuwabara | F28F 13/00 48/127.9 |
| 2007/0041893 | A1* | 2/2007 | Holladay | C01B 3/326 423/648.1 |
| 2007/0068076 | A1* | 3/2007 | Isozaki | B01J 19/0093 48/127.9 |
| 2009/0068511 | A1* | 3/2009 | Lee | B01J 23/8953 429/425 |
| 2009/0238751 | A1* | 9/2009 | Wilhite | C01B 3/34 423/648.1 |
| 2009/0326279 | A1* | 12/2009 | Tonkovich | B01F 5/0475 568/487 |
| 2014/0030156 | A1 | 1/2014 | Park et al. | |
| 2014/0072892 | A1* | 3/2014 | Maenishi | B01J 8/001 429/423 |
| 2014/0093794 | A1* | 4/2014 | Kita | H01M 8/0675 429/412 |
| 2014/0140896 | A1 | 5/2014 | Moon et al. | |
| 2017/0110749 | A1* | 4/2017 | Waller | H01M 8/0618 |
| 2018/0236431 | A1* | 8/2018 | Tiemann | C07C 31/205 |

OTHER PUBLICATIONS

Written Opinion for PCT/FR2016/052092 , dated Nov. 16, 2016 (English translation).

* cited by examiner

EXCHANGER-REACTOR PERFORMING STEAM REFORMING AND WATER GAS REACTIONS FOR THE PRODUCTION OF HYDROGEN

CROSS REFERENCE TO RELATED APPLICATIONS

This application is a 371 of International Application PCT/FR2016/052092 filed Aug. 19, 2016, which claims priority to French Patent Application 1557876 filed Aug. 24, 2015, the entire contents of which are incorporated herein by reference.

BACKGROUND

The present invention relates to an exchanger-reactor that integrates steam-reforming and water-gas shift reactions for the production of hydrogen.

Currently, the most common process for producing hydrogen is the steam reforming of a hydrocarbon-based feedstock. This reaction is catalytic and endothermic, the conversion of methane is favored at high temperature. The heat needed for the reaction is obtained by combustion in a radiative furnace. The synthesis gas is therefore obtained at high temperature (i.e. at around 900° C.). In the current process, the synthesis gas thus produced is subsequently subjected to a cooling and several purification steps. Among these purification steps is the water-gas shift reaction, which consists in converting the CO contained in the synthesis gas at the outlet of the reformer into $H_2$ and $CO_2$ by reaction with the steam in the presence of a catalyst by the following reaction:

$$CO+H_2O=H_2+CO_2$$

This reaction is exothermic, the production of hydrogen is therefore thermodynamically favored at low temperature. This reaction may be carried out at various temperatures depending on the type of catalyst used. Industrially, four "types" of water-gas shift reaction are distinguished depending on the operating temperature and the catalyst used.

Reference is made to a high-temperature water-gas shift reaction (also referred to as HT shift) for temperatures between 350° C. and 450° C.

Reference is made to a medium-temperature water-gas shift reaction (also referred to as MT shift) for temperatures between 200° C. and 350° C.

Reference is made to a low-temperature water-gas shift reaction (also referred to as LT shift) for temperatures between 190° C. and 235° C.

Reference may also be made to a super-high-temperature water-gas shift reaction (also referred to as S-HT shift) for temperatures between 500 and 650° C.

The first three "types" of water-gas shift reaction are nowadays commonly encountered in industrial units and are carried out in adiabatic fixed-bed catalytic reactors.

Nowadays, one already widespread optimization proposes carrying out the steam-reforming or water-gas shift reaction in an exchanger-reactor and more particularly in plate exchanger-reactors. On the other hand, it is not proposed to integrate steam-reforming and water-gas shift reactions within the same plate exchanger-reactor, and a fortiori within a monolithic exchanger-reactor, i.e. an exchanger-reactor that has no assembly interface between the stages.

In a solution according to document U.S. Pat. No. 7,250,151, the heat needed for the methane steam-reforming reaction is generated within the exchanger-reactor itself (a catalytic combustion is carried out on combustion plates). However, this solution is complex since it is difficult for the catalytic combustion inside the channels to be stable. Furthermore, this solution does not incorporate a zone where the water-gas shift reaction can take place.

Hence, one problem that is faced is to provide an improved exchanger-reactor that enables the steam-reforming and water-gas shift reactions to be carried out within the same exchanger-reactor.

SUMMARY

One solution of the present invention is an exchanger-reactor comprising at least three stages with at least one stage comprising both:
- millimetric channels covered at least partially with a catalyst suitable for promoting a steam-reforming reaction, and
- millimetric channels covered at least partially with a catalyst suitable for promoting a water-gas shift reaction.

Within the context of the present invention, "stages" will be referred to for any type of exchanger-reactor, that is to say for exchanger-reactors having plates and assembly interfaces between the plates and for exchanger-reactors that are monolithic parts, that is to say parts that have no assembly interfaces between the stages. Such a monolithic part may be obtained by an additive method, for example.

Millimetric channels is understood to mean channels of rectangular, cylindrical or semi-cylindrical shape or of any other shape, the hydraulic diameter of which is between 0.1 mm and 5 mm. The hydraulic diameter (Dh) is defined as the ratio:

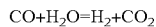

$$Dh = \frac{4A}{P}$$

where A is the cross section of the channel and P the wetted perimeter of the channel.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
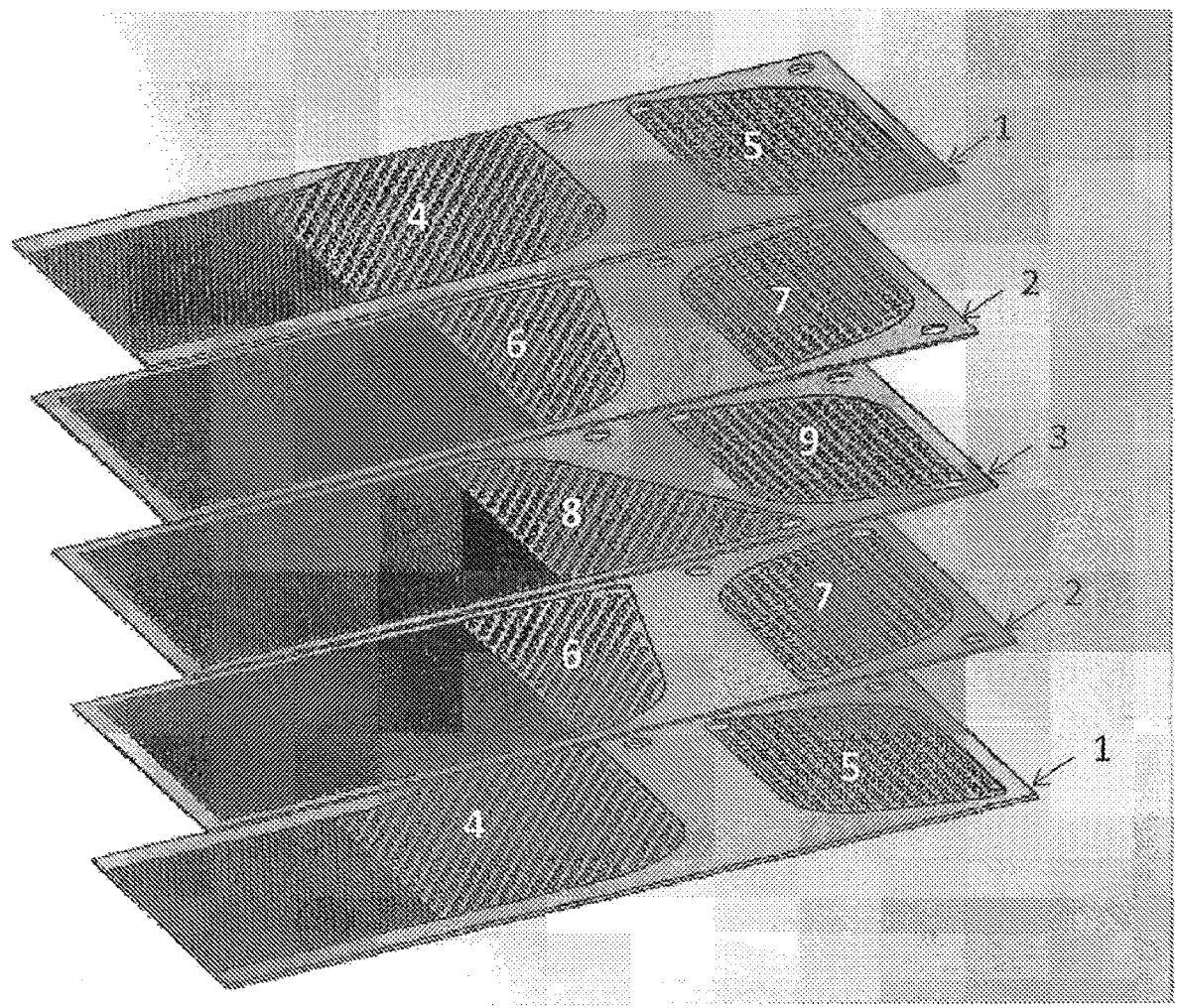
FIG. 1 illustrates the third stage being flanked by two second stages and the assembly thus being formed by the third stage and the two second stages being flanked by two first stages, in accordance with one embodiment of the present invention.

Preferably said exchanger-reactor according to the invention comprises a superposition of the following three stages:
at least one first stage (1) comprising a first zone (4) of millimetric channels enabling the circulation of a fluid at a temperature above 700° C. in order to provide some of the heat needed for a steam-reforming reaction and a second zone (5) of millimetric channels enabling the circulation of a fluid at a temperature below 650° C. and preferentially below 500° C., in order to recover the heat generated by a water-gas shift reaction;

at least one second stage (2) comprising a first zone (6) of millimetric channels covered at least partially with a catalyst suitable for promoting a steam-reforming reaction and second zone (7) of millimetric channels covered at least partially with at least one catalyst suitable for promoting a water-gas shift reaction; and at least one third stage (3) comprising a first zone (8) of millimetric channels enabling the circulation of the synthesis gas obtained by the steam-reforming reaction in order to recover some of the heat needed for the steam-reforming reaction and a second zone (9) of millimetric channels enabling the circulation of a fluid at a temperature below 650° C. and preferentially below 500° C., in order to recover the heat generated by the water-gas shift reaction.

The fluids circulate in the following manner:

the "hot" fluid with an entry temperature into the equipment of above 700° C. circulates in the first zone of the first stage for the purpose of providing some of the heat needed for the steam-reforming reaction;

the "cold" fluid with a temperature below 650° C. and preferentially below 500° C. circulates in the second zone of the first stage and in the second zone of the third stage for the purpose of recovering the heat released by the water-gas shift reaction;

the reaction mixture circulates in the first zone of the second stage where the steam-reforming reaction takes place. The synthesis gas produced by the steam-forming reaction passes into the first zone of the third stage where it gives some of its heat to the reaction mixture then it passes into the second zone of the second stage where the water-gas shift reaction takes place.

More preferentially still, the third stage 3 is flanked by two second stages 2 and the assembly thus formed by the third stage 3 and the two second stages is itself flanked by two first stages 1 (FIG. 1).

The "products" stage 3 is located between two reaction stages 2. The reactive mixture which circulates in the channels of the reaction stage 2 is colder than the synthesis gas that circulates countercurrent in the channels of the "products" stage 3. Therefore, there is a possibility of exchanging heat from the synthesis gas to the reactive mixture and therefore of recovering heat. It is therefore possible to specify that these are the characteristics of the stage that enable heat recovery and the position thereof in the stack and the countercurrent circulation of the synthesis gas that is hotter than the mixture. The transfer takes place by convection between the synthesis gas and the walls of the channel in which it circulates, then by conduction within the thickness of the stages and finally by convection between the walls of the reactive mixture channels and the gas to be steam-reformed. The characteristic sizes of the millimetric channels and the small thicknesses of walls between the channels located between two different stages make it possible to maximize the heat transfer. For a given material, the thicknesses of walls between the channels of the same stage or between the channels of two successive stages are less than 2 mm. The exchanger-reactors are manufactured from nickel-based type materials (Inconel 601-625-617-690).

Figure 2:
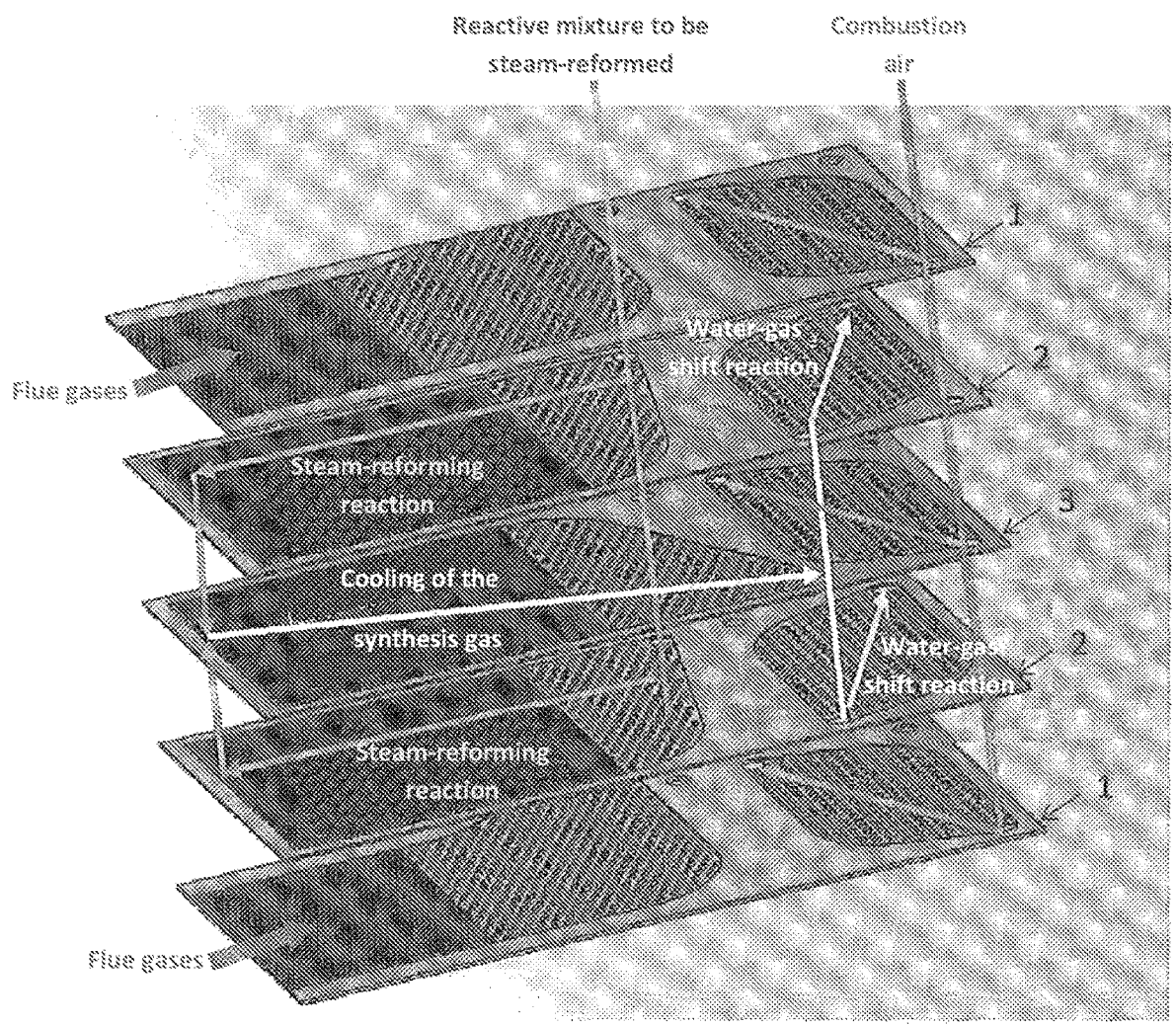
FIG. 2 illustrates the circulation of the fluids within the exchanger-reactor, in accordance with one embodiment of the present invention.

For better understanding, the circulation of the fluids within the exchanger-reactor will be described with the aid of FIG. 2.

The feedstock to be steam-reformed is introduced on the stages 2 in the zones 6 and circulates countercurrent to the flue gases introduced in zone 4 of the stages 1 which make it possible to provide some of the heat to the feedstock to be steam-reformed. Once the steam reforming has been carried out, the synthesis gas passes into zone 8 of the plate 3 through openings located at the end of the zones 6 of the plates (in the case of a stack of plates with assembly interfaces between the plates) or by the connection of two channels of the zones 6 of the stages 2 which join up at the end of the zone 8 of the stages 3 (in the case of a monolithic exchanger-reactor obtained for example by an additive method). The synthesis gas then leaves the exchanger-reactor at the end of the zone 8. The flue gases leave at the end of the zone 4 on the side of the exchanger-reactor. The synthesis gas then undergoes a quenching outside of the exchanger-reactor by passing in particular into a boiler. The synthesis gas re-enters the exchanger-reactor at the end of the sections 7 of the stages 2 in order to carry out the shift reaction. The combustion air circulates countercurrent to the synthesis gas by entering via the opposite end of the zones 5 of the stages 1 and 2. The shift reaction is therefore cooled by the combustion air and the air is preheated. This shift/air heat recovery does not usually exist and helps to improve the efficiency of the whole of the process compared to conventional processes. If necessary, a continuity of the circulation of the fluids on the stages could be envisaged by adding a zone of vaporization of the water against the synthesis gas.

The length of the delimitation between the steam-reforming zone and the water-gas shift reaction zone should be determined as a function of the study of the stress fields of the equipment and the maximum stresses allowable by the material. Specifically, it will be necessary to adapt this length as a function of the temperature gradient along the exchanger in order to have allowable mechanical stresses.

It is therefore proposed here to integrate the steam-reforming and water-gas shift reactions in the same plate exchanger-reactor. Moreover, in the proposed integration, the water-gas shift reaction is continuously cooled by a fluid (for example air or water). This makes it possible to operate the reactor at an overall lower temperature (that is to say between 350° C. and 190° C., preferably between 250° C. and 190° C.) than in a conventional adiabatic reactor, by discharging for example the heat produced by the exothermic water-gas shift reaction (isothermal operation) or by cooling more (cooled reactor). The objective targeted by an operation at an overall lower temperature in the reactor is to thermodynamically favor the conversion of the carbon monoxide and the production of hydrogen. Moreover, the heat recovered by the fluid that is used to cool the water-gas shift reaction may be reused in other parts of the process. For example, if air is used as coolant, the air thus preheated can be used directly as combustion air in burners, being preheated it is possible to reduce the amount of fuel needed for the process. Moreover, some of the heat needed for the steam-reforming reaction is provided by the synthesis gas, which makes it possible to improve the overall efficiency of the steam-reforming process, by having the possibility of reducing the excess steam produced by the conventional process.

The solution proposed here therefore allows a high level of thermal integration once implemented in a complete process of a steam-reforming unit.

With the solution proposed here, the heat needed for the steam-reforming reaction is introduced by convection by a "hot" fluid that circulates on certain stages of the exchanger-reactor and by convection by the hot synthesis gas. The water-gas shift reaction is itself continually cooled by a circulation of a "cold" fluid that circulates on certain stages.

The exchanger-reactor according to the invention may also exhibit one or more of the following features:
- the first zones represent between 50% and 95% of the surface area of each stage and the second zones represent between 5% and 50% of the surface area of each stage;
- the catalyst promoting the steam-reforming reaction comprises nanometric metal particles based on Pd, Pt, Ir, Ni, or Rh or on an NiRh mixture;
- the metal particles are supported by an inorganic oxide;
- the catalysts promoting the water-gas shift reaction comprise nanometric metal particles;
- the nanometric particles are dispersed on inorganic oxides;
- said exchanger-reactor has no assembly interfaces between the various stages;
- said exchanger-reactor is manufactured by an additive manufacturing method.

The invention proposes an innovative integration of the steam-reforming and water-gas shift reactions within the same exchanger-reactor and preferentially within a plate/multistage exchanger-reactor. The first advantage of this solution therefore originates from the coupling of the steam-reforming and water-gas shift reactions within the same exchanger-reactor, which enables a gain in compactness.

Moreover, in the proposed solution the exothermic water-gas shift reaction is cooled continuously by the circulation of a fluid (for example air or water) which is carried out countercurrent. This makes it possible to work at an overall lower temperature than a conventional adiabatic reactor and preferably an isothermal operation of the reactor will be targeted in order to increase the conversion of the CO and the production of hydrogen. Thus, for a given industrial hydrogen production unit, it will be possible by means of the proposed integration to increase the yield of the unit and to thus reduce the feedstock gas consumption. Furthermore, the use of exchanger-reactors that bring together both the steam-reforming and water-gas shift reactions offers greater flexibility for an industrial unit since in order to increase the production capacity it is sufficient to multiply the number of exchanger-reactors in parallel.

Finally, it is pointed out that if these reactions take place in microchannels or millichannels, the mass and heat transfers could be improved by reduction of the characteristic distances, which will result either in an increase in the production of hydrogen for a constant hydrocarbon-based feedstock at the inlet or in a reduction in the consumption of hydrocarbon-based feedstock for a fixed hydrogen production. By increasing the mass and heat transfers, it is possible to work with this type of equipment with much shorter transit times (typically 10 times shorter) than in conventional steam-reforming and water-gas shift reactors. Moreover, the amounts of catalysts employed are much smaller (typically 100 times smaller) than for conventional reactors.

The synthesis gas is produced in an exchanger-reactor, an assembly of stages consisting of millimetric channels and comprising two distinct zones on each stage. A first zone is devoted to the endothermic methane steam-reforming reaction; a second zone is devoted to the exothermic water-gas shift reaction.

In the first zone, this reactor comprises at least one stage where a hot gas (e.g. flue gases at a temperature between 700° C. and 1100° C.) circulates in order to provide some of the heat needed for the reaction, at least one reactive stage that is covered with catalyst and where the steam-reforming reaction takes place (at temperatures between 700° C. and 1000° C.) and at least one stage where the synthesis gas produced circulates, providing heat to the reaction. The steam-reforming catalyst will preferentially consist of nanometric metal particles based on i) Ni, ii) Rh, iii) an NiRh mixture. Other metals may also be suitable such as Pd, Pt, Ir. The metals will be supported on an inorganic oxide of spinel type (Mg aluminate, Ca aluminate, etc.). These ultra-divided metal particles will be highly dispersed in order to result in a highly reactive material. The catalyst will be able to be deposited on the metal plates by any known technique (washcoat, etc.).

The stage where a hot gas circulates comprises a second zone where a coolant (e.g. cold air) circulates, which makes it possible to cool the zone where the water-gas shift reaction takes place. The reactive stage comprises in the first zone a catalyst for the steam reforming and the second zone is completely or partly covered with a catalyst for the water-gas shift reaction. It is also possible to envisage depositing, in a controlled manner, several water-gas shift reaction catalysts in order to best respond to the range of operating temperatures that may be encountered along a channel devoted to the water-gas shift reaction. The various water-gas shift reaction catalyst sections will be catalysts consisting of nanometric metal particles highly dispersed on inorganic oxides that act as supports or blocking agents. These catalysts could be:
- S-HTS section: based on a mixture of CeZr oxides;
- HTS section: based on Fe, the dispersion of which is ensured by the presence of Cr oxide, or based on Zn dispersed on alumina. These two systems will advantageously contain dopants such as Cu and/or K;
- MTS section: based on Cu, the dispersion of which is ensured by the presence of a Zn+Al binary compound. Generally, the Cu content is of the order of 20%;
- LTS section: based on Cu, the dispersion of which is ensured by the presence of a Zn+Al binary compound. Generally, the Cu content is of the order of 40% to 50%. The system may be advantageously doped by an alkali metal, for example Cs (minimization of co-products).

The catalyst will be able to be deposited on the metal plates by any known deposition technique (washcoat, etc.).

Finally, the plate where, in the first zone, the synthesis gas circulates comprises a second zone where a coolant circulates. After the water-gas shift reaction, the gas leaves the reactor at temperatures between 500° C. and 180° C.

The operating pressure of such a system is between 1 atm and 60 atm, preferentially between 20 and 30 atm.

Finally, another subject of the present invention is a process for producing hydrogen using an exchanger-reactor according to the invention.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An exchanger-reactor comprising at least three stages with at least one stage comprising both:
    millimetric channels covered at least partially with a catalyst suitable for promoting a steam-reforming reaction, and
    millimetric channels covered at least partially with a catalyst suitable for promoting a water-gas shift reaction, wherein said exchanger-reactor has no assembly interfaces between the various stages, wherein the exchanger-reactor comprises a superposition of the following three stages:

at least one first stage comprising a hot zone of millimetric channels enabling the circulation of a fluid at a temperature above 700° C. in order to provide at least some of the heat needed for a steam-reforming reaction and a warm zone of millimetric channels enabling the circulation of a fluid at a temperature below 650° C., in order to recover at least some of the heat generated by a water-gas shift reaction;

at least one second stage comprising a hot zone of millimetric channels covered at least partially with a catalyst suitable for promoting a steam-reforming reaction and warm zone of millimetric channels covered at least partially with at least one catalyst suitable for promoting a water-gas shift reaction; and at least one third stage comprising a hot zone of millimetric channels enabling the circulation of a synthesis gas obtained by the steam-reforming reaction in order to recover some of the heat needed for the steam-reforming reaction and a warm zone of millimetric channels enabling the circulation of a fluid at a temperature below 650° C., in order to recover at least some of the heat generated by the water-gas shift reaction.

2. The exchanger-reactor of claim 1, wherein the first zones represent between 50% and 95% of the surface area of each stage and the second zones represent between 5% and 50% of the surface area of each stage.

3. The exchanger-reactor of claim 1, wherein the catalyst promoting the steam-reforming reaction comprises nanometric metal particles based on Pd, Pt, Ir, Ni, or Rh or on an NiRh mixture.

4. The exchanger-reactor of claim 3, wherein the metal particles are supported by an inorganic oxide.

5. The exchanger-reactor of claim 1, wherein the catalysts promoting the water-gas shift reaction comprise nanometric metal particles.

6. The exchanger-reactor of claim 5, wherein the nanometric particles are dispersed on inorganic oxides.

* * * * *